United States Patent
Ortelt et al.

(10) Patent No.: US 10,155,840 B2
(45) Date of Patent: *Dec. 18, 2018

(54) LATENT EPOXY RESIN FORMULATIONS FOR LIQUID IMPREGNATION PROCESSES FOR PRODUCTION OF FIBRE-REINFORCED COMPOSITES

(71) Applicant: Evonik Degussa GmbH, Essen (DE)

(72) Inventors: Martina Ortelt, Flein (DE); Eike Langkabel, Wegberg (DE); Dirk Fuchsmann, Haltern am See (DE); Britta Kohlstruk, Gladbeck (DE); Katharina Karns, Duelmen (DE)

(73) Assignee: Evonik Degussa GmbH, Essen (DE)

( * ) Notice: Subject to any disclaimer, the term of this patent is extended or adjusted under 35 U.S.C. 154(b) by 57 days.

This patent is subject to a terminal disclaimer.

(21) Appl. No.: 15/375,668

(22) Filed: Dec. 12, 2016

(65) Prior Publication Data

US 2017/0166688 A1 Jun. 15, 2017

(30) Foreign Application Priority Data

Dec. 11, 2015 (EP) .................................... 15199600

(51) Int. Cl.
| | |
|---|---|
| B32B 27/26 | (2006.01) |
| B32B 27/38 | (2006.01) |
| C08J 5/24 | (2006.01) |
| C08L 63/00 | (2006.01) |
| C08G 59/50 | (2006.01) |
| C08J 5/04 | (2006.01) |
| C08G 59/56 | (2006.01) |
| C08G 59/68 | (2006.01) |

(52) U.S. Cl.
CPC ......... *C08G 59/502* (2013.01); *C08G 59/506* (2013.01); *C08G 59/56* (2013.01); *C08G 59/686* (2013.01); *C08J 5/04* (2013.01); *C08J 5/042* (2013.01); *C08J 2363/00* (2013.01); *C08J 2363/02* (2013.01)

(58) Field of Classification Search
None
See application file for complete search history.

(56) References Cited

U.S. PATENT DOCUMENTS

| | | | | |
|---|---|---|---|---|
| 3,901,833 | A | * 8/1975 | Flynn | ...................... C03C 25/36 524/904 |
| 4,746,718 | A | * 5/1988 | Gardner | ............ C08G 59/5033 525/471 |
| 5,153,296 | A | 10/1992 | Gras et al. | |
| 5,213,897 | A | 5/1993 | Baron et al. | |
| 5,318,851 | A | 6/1994 | Baron et al. | |
| 2008/0027169 | A1 | 1/2008 | Ortelt | |
| 2009/0205537 | A1 | 8/2009 | Ambrose et al. | |
| 2011/0319564 | A1* | 12/2011 | Corley | ............... C08G 59/5006 525/132 |
| 2017/0166687 | A1* | 6/2017 | Ortelt | ................. C08G 59/3227 |
| 2018/0162991 | A1* | 6/2018 | Ortelt | ......................... C08J 5/04 |

FOREIGN PATENT DOCUMENTS

| | | | |
|---|---|---|---|
| DE | 26 40 408 A1 | 3/1978 | |
| DE | 26 40 409 A1 | 3/1978 | |
| EP | 0 473 905 A2 | 3/1992 | |
| EP | 0 473 905 A3 | 3/1992 | |
| GB | 1568183 A * | 5/1980 | ........... C08G 59/184 |
| GB | 1568725 A * | 6/1980 | ........... C08G 59/506 |
| WO | WO 2005/111135 A1 | 11/2005 | |
| WO | WO 2010/126642 A1 | 11/2010 | |
| WO | WO 2015/158768 A1 | 10/2015 | |

OTHER PUBLICATIONS

European Search Report dated Mar. 8, 2016 in Patent Application No. 15199600.6 (with English translation of categories of cited documents).
U.S. Appl. No. 15/375,792, filed Dec. 12, 2016, Martina Ortelt, et al.

\* cited by examiner

*Primary Examiner* — Michael J Feely
(74) *Attorney, Agent, or Firm* — Grüneberg and Myers PLLC

(57) ABSTRACT

Epoxy compositions containing at least one resin component and at least one hardener component, are suitable as a thermoset matrix for production of semi-finished fiber matrix products and cured fiber matrix laminates.

20 Claims, No Drawings

LATENT EPOXY RESIN FORMULATIONS FOR LIQUID IMPREGNATION PROCESSES FOR PRODUCTION OF FIBRE-REINFORCED COMPOSITES

BACKGROUND OF THE INVENTION

Field of the Invention

The invention provides epoxy compositions consisting of at least one resin component and at least one hardener component, the composition being suitable as a thermoset matrix for production of semi-finished fibre matrix products and cured fibre matrix laminates known as composites.

Discussion of the Background

Epoxy compositions consisting of at least one epoxy resin and at least one hardener, for example amines, anhydrides or dicyandiamide, have long been known and are used in fields of application such as coatings, composites or flooring, for example.

In this context, composites are understood to mean composite materials composed of fibres and polymer matrix.

In the context of increasing requirements for efficient utilization of scarce resources, lightweight construction solutions are gaining increased attention in a wide variety of different industries. Whenever masses have to be moved, fibre composite materials/composites are an option of interest, since these offer high specific stiffnesses and strengths coupled with low weight. For this reason, composites have been established in aviation for decades, and without fibre composite material technologies even rotor blades for wind turbines, for example, would not be conceivable. Because of their excellent profile of properties, these materials are also gaining increasing attention in automobile construction. In all 3 market segments mentioned, components of high mechanical strength are required, as achievable by means of continuous-fibre-reinforced polymer materials. However, the geometries of these components are becoming ever more demanding (for example, the length of the rotor blades of wind turbines is constantly increasing in order to be able to "harvest" a maximum amount of wind energy), with a simultaneous demand for ever higher productivity (for example short cycle times, particularly in automobile manufacture).

In the context of this invention, the term "composites" is particularly used synonymously with the terms "composite components", "composite material", "fibre composite material", "composite mouldings", "fibre-reinforced plastics" or "fibre-reinforced components", "prepregs", "semi-finished fibre-matrix product", "SMC" (sheet moulding compound), "SMC composites" (semi-finished SMC fibre-matrix products), "CFK", "GFK" and "FVK".

Methods of producing composites can be divided into single-stage methods, for example RTM (resin transfer moulding) and VARTM (vacuum-assisted resin transfer moulding), and multistage methods, for example prepreg technology and SMC (sheet moulding compounds).

The route via semi-finished fibre products (for example textile sheetlike structures based on glass fibres or carbon fibres and impregnated with prepolymers, prepregs) in a multistage method has advantages. Particularly in the field of continuous-fibre-reinforced structural components, prepreg technology, because of the excellent wetting quality of the fibres by the resin matrix, offers access to components of extremely high mechanical quality, which is the reason why prepreg technology has already been established for many years in aerospace as the most important processing method for production of composite components. However, semi-finished fibre products, by their nature, are two-dimensional sheetlike structures, which restricts their applicability to the production of flat, essentially two-dimensional or three-dimensional components having limited geometric complexity, for example wing or tail assembly components.

By contrast, continuous-fibre-reinforced composite components having three-dimensional geometries of high complexity are produced by the RTM method. This method is characterized in that what are called near net shape preforms are first produced from sheetlike textile structures. This involves preforming non-resin-impregnated fibre products (i.e. woven fabrics, laid scrims, nonwoven fabrics, etc. as supplied) to three-dimensional structures in near net shape form and at the same time bonding the individual laminas for fixing, or sewing them in the case of particularly complex parts. This pure fibre preform is then introduced into a cavity and, in the closed cavity, for example a heated steel mould, impregnated with a solvent-free liquid resin formulation and, in the closed cavity, through-cured immediately to give the final state (one-stage method). The flow geometries that occur, some of which are of high complexity, require low-viscosity resins having long pot lives in order to efficiently wet all fibre filaments. Accordingly, the resin systems used for the purpose are of low reactivity and require long curing times at high temperatures. After curing, the finished component is demoulded and processed further if necessary, for example deburred.

Suitable low-reactivity solvent-free epoxy resin compositions are anhydride-cureable systems. However it is also possible to formulate amine-cureable epoxy resin compositions having the desired rheological profile. Amine-cureable epoxy resin compositions have advantages over anhydride systems for example in applications where high media-resistance requirements are demanded of the components. Low-reactivity polyamines which, in addition to processing requirements, also fulfil customary requirements of the profile of properties of the finished parts, such as high heat resistance and glass transition temperature and also good mechanical properties, are known.

Documents DE 2640408, DE 2640409, DE 2540410, DE 2950067 and DE 3328134 describe 2,2,6,6-tetramethyl-4-piperidylamine (triacetonediamine or TAD for short) as a latent amine for curing epoxy resins. Possible applications mentioned therein are surface coatings with emphasis on powder coatings, but also moulding compositions which can optionally be reinforced by fibres or other substances. Examples include combinations of pure TAD and epoxy resins.

However, these systems are too unreactive for the requirements of modern efficiency-focused production systems for large-scale manufacture, in particular in the field of automotive engineering. Efficiency gains are achieved here especially through a reduction in curing times as well as through optimized handling systems.

SUMMARY OF THE INVENTION

Problem Addressed by the Invention

The performance of a composite is defined not only by the profile of properties of the resin matrix chosen and of the reinforcing fibres, but very particularly also by the quality of the fibre-matrix composite. A high composite quality requires that the reinforcing fibres are flawlessly wetted by the resin matrix while shear forces occurring due to injection pressure and increasing viscosity resulting from the progress of the reaction and the accompanying increase in molecular weight must remain limited in order to avoid fibre displacement. The fibre arrangement in the finished component is configured according to the expected load paths and every deviation of the fibres from the predefined fibre route that results in clearly perceptible mechanical strength penalties must be avoided.

Solution

It has been found that surprisingly the epoxy resin composition according to the invention may be adjusted within a wide range such that it exhibits the desired flow-cure behaviour at moderate mould temperatures between 100° C. and 140° C. The formulations at temperatures between 100° C. and 140° C. have a low viscosity in the range between 50 mPas and 500 mPas for 60 s to 180 s and through-cure completely with a conversion of ≥99% in 2 to 10 minutes at these temperatures, glass transition temperatures of 120° C. to 140° C. being achieved.

DETAILED DESCRIPTION OF THE INVENTION

The epoxy resin compositions according to the invention for efficient liquid impregnation processes for the production of three-dimensional components of high complexity have the following advantageous properties:
low viscosity
low viscosity for length of time corresponding to the required flow paths to flawlessly impregnate all fibres
rapid through-curing after impregnation of all fibres to achieve short cycle times (i.e. preferably exhibit a so-called 'SnapCure' profile)
meet all mechanical and thermal stability requirements and exhibit good surface properties.

The invention provides an epoxy resin composition comprising:
A) at least one epoxy compound and
B) a hardener composition consisting of:
B1) 20%-40% by weight of at least one diamine and/or polyamine based on triacetonediamine and
B2) 60%-80% by weight of at least one further diamine and/or polyamine, wherein the stoichiometric ratio of the epoxy groups of A) and the number of active hydrogen atoms of the functional groups of B) varies from 1:0.5 to 1:1, preferably 1:0.6 to 1:0.8,
C) 0.1% to 10% by weight of at least one curing accelerator,
D) optionally at least one latent hardener,
wherein the amounts of A)-D) add up to 100% by weight,
E) optionally further additives.

Component A)

Suitable as component A) are epoxy compounds. Suitable epoxy compounds are described, for example, in EP 675 185.

Contemplated are a multitude of the compounds known for this purpose that contain more than one epoxy group, preferably two epoxy groups, per molecule. These epoxy compounds may be either saturated or unsaturated and aliphatic, cycloaliphatic, aromatic or heterocyclic and may also have hydroxyl groups. They may additionally contain such substituents that do not cause any troublesome side reactions under the mixing or reaction conditions, for example alkyl or aryl substituents, ether moieties and the like. They are preferably glycidyl ethers which derive from polyhydric phenols, especially bisphenols and novolacs, and which have molar masses based on the number of epoxy groups ME ("epoxy equivalent weights", "EV value") between 100 and 1500, but especially between 150 and 250, g/eq.

Polyhydric phenols that may be mentioned by way of example are: resorcinol, hydroquinone, 2,2-bis(4-hydroxyphenyl)propane (bisphenol A), isomer mixtures of dihydroxydiphenylmethane (bisphenol F), 4,4'-dihydroxydiphenylcyclohexane, 4,4'-dihydroxy-3,3'-dimethyldiphenylpropane, 4,4'-dihydroxydiphenyl, 4,4'-dihydroxybenzophenone, bis(4-hydroxyphenyl)-1,1-ethane, bis(4-hydroxyphenyl)-1,1-isobutane, 2,2-bis(4-hydroxy-tert-butylphenyl)propane, bis(2-hydroxynaphthyl)methane, 1,5-dihydroxynaphthalene, tris(4-hydroxyphenyl)methane, bis(4-hydroxyphenyl) ether, bis(4-hydroxyphenyl) sulphone inter alia, and the chlorination and bromination products of the aforementioned compounds, for example tetrabromobisphenol A. It is particularly preferable to employ liquid diglycidyl ethers based on bisphenol A and bisphenol F with an epoxy equivalent weight of 150 to 200 g/eq.

It is also possible to use polyglycidyl ethers of polyalcohols, for example ethane-1,2-diol diglycidyl ether, propane-1,2-diol diglycidyl ether, propane-1,3-diol diglycidyl ether, butanediol diglycidyl ether, pentanediol diglycidyl ether (including neopentyl glycol diglycidyl ether), hexanediol diglycidyl ether, diethylene glycol diglycidyl ether, dipropylene glycol diglycidyl ether, higher polyoxyalkylene glycol diglycidyl ethers, for example higher polyoxyethylene glycol diglycidyl ethers and polyoxypropylene glycol diglycidyl ethers, co-polyoxyethylene-propylene glycol diglycidyl ethers, polyoxytetramethylene glycol diglycidyl ethers, polyglycidyl ethers of glycerol, of hexane-1,2,6-triol, of trimethylolpropane, of trimethylolethane, of pentaerythritol or of sorbitol, polyglycidyl ethers of oxyalkylated polyols (for example of glycerol, trimethylolpropane, pentaerythritol, inter alia), diglycidyl ethers of cyclohexanedimethanol, of bis(4-hydroxycyclohexyl)methane and of 2,2-bis(4-hydroxycyclohexyl)propane, polyglycidyl ethers of castor oil, triglycidyl tris(2-hydroxyethyl)isocyanurate.

Contemplated components A) further include: poly(N-glycidyl) compounds obtainable by dehydrohalogenation of the reaction products of epichlorohydrin and amines such as aniline, n-butylamine, bis(4-aminophenyl)methane, m-xylylenediamine or bis(4-methylaminophenyl)methane. However, the poly(N-glycidyl) compounds also include triglycidyl isocyanurate, triglycidylurazole and oligomers thereof, N,N'-diglycidyl derivatives of cycloalkyleneureas and diglycidyl derivatives of hydantoins inter alia.

In addition, it is also possible to use polyglycidyl esters of polycarboxylic acids which are obtained by the reaction of epichlorohydrin or similar epoxy compounds with an aliphatic, cycloaliphatic or aromatic polycarboxylic acid such as oxalic acid, succinic acid, adipic acid, glutaric acid, phthalic acid, terephthalic acid, tetrahydrophthalic acid, hexahydrophthalic acid, naphthalene-2,6-dicarboxylic acid and higher diglycidyl dicarboxylates, for example dimerized or trimerized linolenic acid. Examples are diglycidyl adipate, diglycidyl phthalate and diglycidyl hexahydrophthalate.

Mention may also be made of glycidyl esters of unsaturated carboxylic acids and epoxidized esters of unsaturated alcohols or unsaturated carboxylic acids. In addition to the polyglycidyl ethers, it is possible to use small amounts of monoepoxides, for example methyl glycidyl ether, butyl glycidyl ether, allyl glycidyl ether, ethylhexyl glycidyl ether, long-chain aliphatic glycidyl ethers, for example cetyl glycidyl ether and stearyl glycidyl ether, monoglycidyl ethers of a higher isomeric alcohol mixture, glycidyl ethers of a mixture of C12 to C13 alcohols, phenyl glycidyl ether, cresyl glycidyl ether, p-tert-butylphenyl glycidyl ether, p-octylphenyl glycidyl ether, p-phenylphenyl glycidyl ether, glycidyl ethers of an alkoxylated lauryl alcohol, and also monoepoxides such as epoxidized monounsaturated hydrocarbons (butylene oxide, cyclohexene oxide, styrene oxide), in proportions by mass of up to 30% by weight, preferably 10% to 20% by weight, based on the mass of the polyglycidyl ethers.

A detailed enumeration of the suitable epoxy compounds can be found in the handbook "Epoxidverbindungen and Epoxidharze" [Epoxy Compounds and Epoxy Resins] by A. M. Paquin, Springer Verlag, Berlin 1958, Chapter IV, and in Lee Neville "Handbook of Epoxy Resins", 1967, Chapter 2.

Preferentially suitable as epoxy compounds are glycidyl ethers and glycidyl esters, aliphatic epoxides, diglycidyl ethers based on bisphenol A and/or bisphenol F, and glycidyl methacrylates. Examples of such epoxides further include triglycidyl isocyanurate (TGIC, trade name: ARALDIT 810, Huntsman), mixtures of diglycidyl terephthalate and triglycidyl trimellitate (trade name: ARALDIT PT 910 and 912, Huntsman), glycidyl esters of Versatic acid (trade name: CARDURA E10, Shell), 3,4-epoxycyclohexylmethyl 3',4'-epoxycyclohexanecarboxylate (ECC), ethylhexyl glycidyl ether, butyl glycidyl ether, pentaerythrityl tetraglycidyl ether (trade name: POLYPDX R 16, UPPC AG), and other Polypox products having free epoxy groups.

It is also possible to use mixtures of the epoxy compounds mentioned.

Particularly preferred as epoxy components are polyepoxides based on bisphenol A diglycidyl ether, bisphenol F diglycidyl ether, 4,4'-methylenebis[N,N-bis(2,3-epoxypropyl)aniline], hexanediol diglycidyl ether, butanediol diglycidyl ether, trimethylolpropane triglycidyl ether, propane-1,2,3-triol triglycidyl ether, pentaerythritol tetraglycidyl ether and diglycidyl hexahydrophthalate.

In accordance with the invention mixtures of these epoxy compounds too may be preferentially used as component A).

The amount of component A) is guided by the composition of component B) and is calculated such that the stoichiometric ratio of the epoxy groups of A) and the number of active hydrogen atoms of the functional groups of B) varies from 1:0.5 to 1:1, preferably 1:0.6 to 1:0.8. This means that one epoxy group from A) reacts per hydrogen atom in the amino group from B).

Component B1)

Polyamines based on triacetonediamine B1) are generally known from the literature. Preferably employed as component B1) are the following amines based on triacetonediamine: 2,2,6,6-tetramethyl-4-aminopiperidine (TAD), hexamethylenebis(4-amino-2,2,6,6-tetramethylpiperidine), N-butyl-4-amino-2,2,6,6-tetramethylpiperidine, N,N-dimethylaminopropyl-4-amino-2,2,6,6-tetramethylpiperidine, N-propyl-4-amino-2,2,6,6-tetramethylpiperidine, N-isopropyl-4-amino-2,2,6,6-tetramethylpiperidine, N-hydroxyethyl-4-amino-2,2,6,6-tetramethylpiperidine, N-methoxyethyl-4-amino-2,2,6,6-tetramethylpiperidine, N-methoxyethyl-4-amino-2,2,6,6-tetramethylpiperidine, N',N'-dimethylaminoethyl-4-amino-2,2,6,6-tetramethylpiperidine, N-morpholinoethyl-4-amino-2,2,6,6-tetramethylpiperidine, N-piperazinoethyl-4-amino-2,2,6,6-tetramethylpiperidine, 4-morpholino-2,2,6,6-tetramethylpiperidine.

It is also possible to use mixtures of the aforementioned amines based on triacetonediamine B1).

Preference is given to using 2,2,6,6-tetramethyl-4-aminopiperidine (TAD) and/or hexamethylenebis(4-amino-2,2,6,6-tetramethylpiperidine).

The amount of component B1) used is generally 20%-40% by weight, preferably 25%-35% by weight, particularly preferably 28%-32% by weight, based on the total amount of B1) and B2).

Component B2)

Suitable as compounds B2) are in principle those diamines and polyamines containing at least 2 amino groups. Diamines and polyamines can also be used in mixtures with latent amines, amino alcohols or polymercaptans.

Di- or polyamines B2) are known in the literature. These may be monomeric, oligomeric and/or polymeric compounds. Monomeric and oligomeric compounds are preferably selected from the group of diamines, triamines, tetramines. The amine group of the di- or polyamines B2) may be attached to a primary, secondary or tertiary carbon atom, preferably to a primary or secondary carbon atom. It is also possible to use mixtures of di- and/or polyamines as component B2).

The following amines, alone or in mixtures, may be used as component B2):

aliphatic amines, such as the polyalkylenepolyamines, preferably selected from ethylene-1,2-diamine, propylene-1,2-diamine, propylene-1,3-diamine, butylene-1,2-diamine, butylene-1,3-diamine, butylene-1,4-diamine, 2-(ethylamino)ethylamine, 3-(methylamino)propylamine, diethylenetriamine, triethylenetetramine, pentaethylenehexamine, trimethylhexamethylenediamine, 2,2,4-trimethylhexamethylenediamine, 2,4,4-trimethylhexamethylenediamine, 2-methylpentanediamine, hexamethylenediamine, N-(2-aminoethyl)ethane-1,2-diamine, N-(3-aminopropyl)propane-1,3-diamine, N,N"-1,2-ethanediylbis(1,3-propanediamine), dipropylenetriamine, adipic dihydrazide, hydrazine;

oxyalkylenepolyamines selected from polyoxypropylenediamine and polyoxypropylenetriamine (e.g. Jeffamine® D-230, Jeffamine® D-400, Jeffamine® T-403, Jeffamine® T-5000), 1,13-diamino-4,7,10-trioxatridecane, 4,7-dioxadecane-1,10-diamine;

cycloaliphatic amines selected from isophoronediamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, alone or in mixtures of the isomers, 3,3'-dimethyl-4,4'-diaminodicyclohexylmethane, N-cyclohexyl-1,3-propanediamine, 1,2-diaminocyclohexane, 3-(cyclohexylamino)propylamine, piperazine, N-aminoethylpiperazine, TCD diamine (3(4),8(9)-bis(aminomethyl)tricyclo[5.2.1.0$^{2,6}$]decane), 4-methylcyclohexane-1,3-diamine araliphatic amines, such as xylylenediamines;

aromatic amines selected from phenylenediamines, phenylene-1,3-diamine, phenylene-1,4-diamine, 4,4'-diaminodiphenylmethane, 2,4'-diaminodiphenylmethane, 2,2'-diaminodiphenylmethane, alone or in mixtures of the isomers;

adduct hardeners which are the reaction products of epoxy compounds, especially glycidyl ethers of bisphenol A and F, with excess amine;

polyamidoamine hardeners which are obtained by condensation of mono- and polycarboxylic acids with polyamines, especially by condensation of dimer fatty acids with polyalkylenepolyamines;

Mannich base hardeners which are obtained by reaction of mono- or polyhydric phenols with aldehydes, especially formaldehyde, and polyamines;

Mannich bases, for example based on phenol and/or resorcinol, formaldehyde and m-xylylenediamine, and also N-aminoethylpiperazine and blends of N-aminoethylpiperazine with nonylphenol and/or benzyl alcohol, phenalkamines which are obtained in a Mannich reaction from cardanols, aldehydes and amines.

It is also possible to use mixtures of the aforementioned di- or polyamines as component B2).

Preference is given to using diamines as component B2) selected from isophoronediamine (3,5,5-trimethyl-3-aminomethylcyclohexylamine, IPD), 4,4'-diaminodicyclohexylmethane, 2,4'-diaminodicyclohexylmethane, 2,2'-diaminodicyclohexylmethane (also referred to as PACM), alone or in mixtures of the isomers, a mixture of the isomers of 2,2,4-trimethylhexamethylenediamine and 2,4,4-trimethylhexamethylenediamine (TMD), adduct hardeners based on the reaction products of epoxy compounds and the aforementioned amines B2) or combination of the aforementioned amines B2). It is also possible to use mixtures of these compounds.

It is very particularly preferable when
a) isophoronediamine (3,5,5-trimethyl-3-aminomethylcyclohexylamine, IPD),
b) and/or a combination of isophoronediamine and a mixture of the isomers of 2,2,4-trimethylhexamethylenediamine and 2,4,4-trimethylhexamethylenediamine (TMD), and/or 4,4'-diaminodicyclohexylmethane, 2,4'-diaminodicyclohexylmethane, 2,2'-diaminodicyclohexylmethane (also known as PACM), alone or in mixtures of the isomers,
c) and/or adduct hardeners based on the reaction products of epoxy compounds and the aforementioned amines B2) or combination of the aforementioned amines B2)
are used as component B2).

According to the invention, amino alcohols can be used as a further component to the diamines and polyamines in mixtures in component B2). Examples of amino alcohols that may be mentioned include monoethanolamine, 3-amino-1-propanol, isopropanolamine, aminoethoxyethanol, N-(2-aminoethyl)ethanolamine, N-ethylethanolamine, N-butylethanolamine, diethanolamine, 3-(hydroxyethylamino)-1-propanol, isophorone amino alcohol and diisopropanolamine. Amino alcohols can be used alone or as mixtures of two or more amino alcohols together with di- and polyamines as component B2).

According to the invention, polymercaptans can be used as a further component to the diamines and polyamines in mixtures in component B2). Examples of mercaptans, also called thiols, that may be mentioned include ethanethiol, dithiothreitol, dithioerythritol, glyceryl dithioglycolate, glycol dimercaptoacetate, trimethylolpropane trimercaptoacetate, pentaerythritol tetramercaptoacetate, glycol di(3-mercaptopropionate), trimethylolpropane tri(3-mercaptopropionate), pentaerythritol tetra(3-mercaptopropionate), dipentaerythritol hexa(3-mercaptopropionate), ethoxylated trimethylolpropane tri(3-mercaptopropionate) (product name: Thiocure ETTMP 1300), tris[2-(3-mercaptopropionyloxy)ethyl] isocyanurate. Further mercaptans are described, for example, in EP394495A1, U.S. Pat. No. 4,775,733A1 and WO2007096425A2. Mercaptans can be used alone or as mixtures of two or more mercaptans together with di- and polyamines as component B2).

In addition to the di- and polyamines mentioned, it is possible to use the di- and polyamines together with polyphenols as component B2). Examples of these are mentioned in "Epoxy Resins—Chemistry and Technology; Curing Agents and Modifiers; p. 481-482, 2nd edition 1988". Polyphenols can be used alone or as mixtures of two or more polyphenols together with di- and polyamines as component B2).

The amount of component B2) used is generally 60%-80% by weight, preferably 65% to 75% by weight, particularly preferably 68%-72% by weight, based on the total amount of B1) and B2).

Component C) Curing Accelerators

In addition, curing accelerators are present as component C) and are added as catalysts for the epoxy-amine reaction. Suitable accelerators are described in: H. Lee and K. Neville, *Handbook of Epoxy Resins*, McGraw-Hill, New York, 1967. According to the invention, 0.1% to 10% by weight, preferably 0.1% to 5% by weight, particularly preferably 0.5% to 2.0% by weight based on the total amount of the components of at least one curing accelerator is used.

Examples of suitable accelerators are organic acids such as salicylic acid, dihydroxybenzoic acid, trihydroxybenzoic acid, methylsalicylic acid, 2-hydroxy-3-isopropylbenzoic acid or hydroxynaphthoic acids, lactic acid and glycolic acid, tertiary amines such as benzyldimethylamine (BDMA), 1,4-diazabicyclo[2.2.2]octane (DABCO), triethylamine, N,N'-dimethylpiperazine or aminoethylpiperazine (AEP), hydroxylamines such as dimethylaminomethylphenol, bis(dimethylaminomethyl)phenol, 2,4,6-tris(dimethylaminomethyl)phenol (Ancamine K54), urons such as 3-(4-chlorophenyl)-1,1-dimethylurea (monuron), 3-(3,4-dichlorophenyl)-1,1-dimethylurea (diuron), 3-phenyl-1,1-dimethylurea (fenuron), 3-(3-chloro-4-methylphenyl)-1,1-dimethylurea (chlortoluron), tetraalkylguanidines such as N,N,N',N'-tetramethylguanidine (TMG), imidazole and imidazole derivatives such as 1H-imidazole, 1-methylimidazole, 2-methylimidazole, 1-benzyl-2-methylimidazole, 2-ethyl-4-methylimidazole, 2-phenylimidazole, 2-phenyl-4-methylimidazole, 1-vinylimidazole, 1-(2-hydroxyethyl)imidazole, 1,2-dimethylimidazole, 1-cyanoethylimidazole and the suitable salts thereof, phenol and phenol derivatives such as t-butylphenol, nonylphenol, bisphenol A or bisphenol F, and organic or inorganic salts and complexes such as methyltriphenylphosphonium bromide, calcium nitrate (Accelerator 3130), or carboxylates, sulphonates, phosphonates, sulphates, tetrafluoroborates or nitrates of Mg, Ca, Zn and Sn. Particular preference is given to imidazole and imidazole derivatives.

Component D)

In addition to component B2), it is possible to use latent hardeners as component D). An additional latent hardener used may in principle be any compound known for this purpose, i.e. any compound which is inert toward epoxy resins below the defined limiting temperature of 80° C. but reacts rapidly with crosslinking of the resin as soon as this limiting temperature has been exceeded. The limiting temperature of the employed latent hardeners is preferably at least 85° C., in particular at least 100° C. Such compounds are well known and also commercially available. In principle, it is possible to use latent hardeners selected from dicyandiamide, cyanoguanidines, aromatic amines, guanidines, modified polyamines, N-acylimidazoles, imidazoles, carbonyl hydrazides, triazine derivatives, melamine and derivatives thereof, N-cyanoacylamide compounds, acylthiopropylphenols.

Examples of suitable latent hardeners are dicyandiamide, cyanoguanidines, for example the compounds described in U.S. Pat. No. 4,859,761 or EP-A-306 451, aromatic amines, for example 4,4'- or 3,3'-diaminodiphenyl sulphone, or guanidines, for example 1-o-tolylbiguanide, or modified polyamines, for example Ancamine TM 2014 S (Anchor Chemical UK Limited, Manchester).

Suitable latent hardeners are also N-acylimidazoles, for example 1-(2,4,6-trimethylbenzoyl)-2-phenylimidazole or 1-benzoyl-2-isopropylimidazole. Such compounds are described, for example, in U.S. Pat. No. 4,436,892, U.S. Pat. No. 4,587,311 or JP Patent 743,212.

Further suitable hardeners are metal salt complexes of imidazoles, as described, for example, in U.S. Pat. No. 3,678,007 or U.S. Pat. No. 3,677,978, carbonyl hydrazides, for example adipic dihydrazide, isophthalic dihydrazide or anthranilic hydrazide, triazine derivatives, for example 2-phenyl-4,6-diamino-s-triazine (benzoguanamine) or 2-lauryl-4,6-diamino-s-triazine (lauroguanamine), and melamine and derivatives thereof. The latter compounds are described, for example, in U.S. Pat. No. 3,030,247.

Other suitable latent hardeners are cyanoacetyl compounds, as described, for example, in U.S. Pat. No. 4,283,520, for example neopentyl glycol bis(cyanoacetate), N-isobutylcyanoacetamide, hexamethylene 1,6-bis(cyanoacetate) or cyclohexane-1,4-dimethanol bis(cyanoacetate).

Suitable latent hardeners are also N-cyanoacylamide compounds, for example N,N'-dicyanoadipamide. Such compounds are described, for example, in U.S. Pat. No. 4,529,821, U.S. Pat. No. 4,550,203 and U.S. Pat. No. 4,618,712.

Further suitable latent hardeners are the acylthiopropylphenols described in U.S. Pat. No. 4,694,096 and the urea derivatives disclosed in U.S. Pat. No. 3,386,955, for example toluene-2,4-bis(N,N-dimethylcarbamide).

Preferred latent hardeners are 4,4'-diaminodiphenyl sulphone and dicyandiamide.

Component D) can be used in amounts of 1%-30% by weight, preferably 3%-25% by weight and particularly preferably in amounts of 5%-20% by weight, based on the sum total of components B1), B2) and D).

If a latent hardener is used in addition to component B2), component A) is chosen in such amounts that the ratio of the epoxy groups of A) and the sum of the functional groups of B) and D) is 1:0.5 to 1:1, preferably 1:0.6 to 1.0.8.

Component E) Additives

The composition of the invention may optionally comprise additives. Additives are understood to mean substances which are generally added in order to alter the properties of the epoxy composition in the desired direction, for example to match viscosity, wetting characteristics, stability, reaction rate, blister formation, storability or adhesion, and also use properties, to the end use. Suitable additives are described, for example, in WO 99/55772, p. 15-25, and in "Plastics Additives, R. Gächter and H. Müller, Hanser Publishers 1983". These can be added to component A) or B).

For example, it is possible to add light stabilizers, for example sterically hindered amines, or other auxiliaries as described, for example, in EP 669 353 in a total amount of 0.05% to 5% by weight.

For the production of the reactive compositions of the invention, it is additionally possible to add additives such as levelling agents, for example polysilicones or adhesion promoters, for example those based on acrylate. In addition, still further components may optionally be present.

Auxiliaries and additives used in addition may be chain transfer agents, plasticizers, stabilizers and/or inhibitors.

In addition, it is possible to add dyes, nanoscale fillers, tougheners (toughness improvers), mould release agents, flame retardants, pigments, desiccants, wetting, dispersing and levelling auxiliaries, adhesion promoters, UV stabilizers, defoamers and rheology additives.

The invention also provides for the use of an epoxy resin composition comprising:
A) at least one epoxy compound and
B) a hardener composition consisting of:
B1) 20%-40% by weight of at least one diamine and/or polyamine based on triacetonediamine and
B2) 60%-80% by weight of at least one further diamine and/or polyamine,
wherein the stoichiometric ratio of the epoxy groups of A) and the number of active hydrogen atoms of the functional groups of B) varies from 1:0.5 to 1:1, preferably 1:0.6 to 1:0.8,
C) 0.1% to 10% by weight of at least one curing accelerator,
D) optionally at least one latent hardener,
wherein the amounts of A)-D) add up to 100% by weight,
E) optionally further additives,
for production of composites.

The invention also provides composite components essentially constructed from
1) at least one fibrous carrier and
2) an epoxy resin composition comprising:
A) at least one epoxy compound and
B) a hardener composition consisting of:
B1) 20%-40% by weight of at least one diamine and/or polyamine based on triacetonediamine and
B2) 60%-80% by weight of at least one further diamine and/or polyamine,
wherein the stoichiometric ratio of the epoxy groups of A) and the number of active hydrogen atoms of the functional groups of B) varies from 1:0.5 to 1:1, preferably 1:0.6 to 1:0.8,
C) 0.1% to 10% by weight of at least one curing accelerator,
D) optionally at least one latent hardener,
wherein the amounts of A)-D) add up to 100% by weight,
E) optionally further additives.

Fibrous Carrier

The fibrous carrier material used with preference in accordance with the invention is characterized in that the fibrous carriers consist for the most part of glass, carbon, plastics such as polyamide (aramid) or polyester, natural fibres, or mineral fibre materials such as basalt fibres or ceramic fibres, individually or of mixtures, or of multiple plies of various fibre types.

The fibrous carriers take the form of sheetlike textile structures made from nonwoven fabric, of knitted fabric including loop-formed and loop-drawn knits, of non-knitted structures such as woven fabrics, laid scrims or braids, or of long-fibre or short-fibre materials, individually or of multiple plies of various types.

In detail, the implementation is as follows: The fibrous carrier in the present invention consists of fibrous material (also often called reinforcing fibres). Any material that the fibres consist of is generally suitable, but preference is given to using fibrous material made of glass, carbon, plastics such as polyamide (aramid) or polyester, natural fibres, or mineral fibre materials such as basalt fibres or ceramic fibres (oxidic fibres based on aluminium oxides and/or silicon oxides). It is also possible to use mixtures of fibre types, for example woven fabric combinations of aramid and glass fibres, or carbon and glass fibres.

Mainly because of their relatively low cost, glass fibres are the most commonly used fibre types. In principle, all types of glass-based reinforcing fibres are suitable here (E glass, S glass, R glass, M glass, C glass, ECR glass, D glass, AR glass, or hollow glass fibres).

Carbon fibres are generally used in high-performance composites, where another important factor is the lower density compared to glass fibres with simultaneously high strength. Carbon fibres are industrially produced fibres composed of carbonaceous starting materials which are converted by pyrolysis to carbon in a graphite-like arrangement. A distinction is made between isotropic and anisotropic types: isotropic fibres have only low strengths and lower industrial significance; anisotropic fibres exhibit high strengths and rigidities with simultaneously low elongation at break. Natural fibres refer here to all textile fibres and fibrous materials which are obtained from plant and animal material (for example wood fibres, cellulose fibres, cotton fibres, hemp fibres, jute fibres, flax fibres, sisal fibres and bamboo fibres). Similarly to carbon fibres, aramid fibres exhibit a negative coefficient of thermal expansion, i.e. become shorter on heating. Their specific strength and their modulus of elasticity are markedly lower than those of carbon fibres. In combination with the positive coefficient of expansion of the matrix resin, it is possible to produce components of high dimensional stability. Compared to carbon fibre-reinforced plastics, the compressive strength of aramid fibre composites is much lower. Known brand names for aramid fibres are Nomex® and Kevlar® from DuPont, or Teijinconex®, Twaron® and Technora® from Teijin. Particularly suitable and preferred carriers are those made of glass fibres, carbon fibres, aramid fibres or ceramic fibres. The fibrous material is a sheetlike textile structure. Suitable materials are sheetlike textile structures made from nonwoven fabric, and likewise knitted fabric including loop-formed and loop-drawn knits, but also non-knitted fabrics such as woven fabrics, laid scrims or braids. In addition, a distinction is made between long-fibre and short-fibre materials as carriers. Likewise suitable in accordance with the invention are rovings and yarns. In the context of the invention, all the materials mentioned are suitable as fibrous carriers. An overview of reinforcing fibres is contained in "Composites Techologien", Paolo Ermanni (Version 4), script for lecture at ETH Zürich, August 2007, Chapter 7.

The invention also provides a method of producing composites by the method steps of:
I. providing a reactive composition comprising
A) at least one epoxy compound and
B) a hardener composition consisting of:
B1) 20%-40% by weight of at least one diamine and/or polyamine based on triacetonediamine and
B2) 60%-80% by weight of at least one further diamine and/or polyamine,
wherein the stoichiometric ratio of the epoxy groups of A) and the number of active hydrogen atoms of the functional groups of B) varies from 1:0.5 to 1:1, preferably 1:0.6 to 1:0.8,
C) 0.1% to 10% by weight of at least one curing accelerator,
D) optionally at least one latent hardener,
wherein the amounts of A)-D) add up to 100% by weight,
E) optionally further additives;
II. impregnating a fibrous carrier with the composition from I. in a closed mould;
III. curing the reactive composition to afford the composite component in the closed mould; and
IV. demoulding the finished component from the cavity.

The invention especially also provides for the use of the composites produced in accordance with the invention in boat- and shipbuilding, in aerospace technology, in automobile construction, for two-wheeled vehicles, preferably motorcycles and pedal cycles, in the automotive, construction, medical technology and sports sectors, the electrical and electronics industry, energy generation installations, for example for rotor blades in wind turbines.

Having generally described this invention, a further understanding can be obtained by reference to certain specific examples which are provided herein for purposes of illustration only, and are not intended to be limiting unless otherwise specified.

EXAMPLES

The feedstocks utilized in the examples which follow are elucidated in Table 1.

TABLE 1

| Feedstocks | | | |
|---|---|---|---|
| Trade name | Supplier | Chemical name | Abbreviation |
| Triacetonediamine | Evonik Industries | 2,2,6,6-Tetramethyl-4-aminopiperidine | TAD |
| Vestamin ® IPD | Evonik Industries | 3-Aminomethyl-3,5,5-trimethyl-cyclohexylamine | IPD |
| Vestamin ® TMD | Evonik Industries | Isomer mixture of 2,2,4-trimethylhexa methylenediamine and 2,4,4-trimethylhexa-methylenediamine | TMD |
| Epikote ® 828 | Hexion | Epoxy resin composed of bisphenol A and epichlorohydrin | — |
| 2-Methylimidazole | Sigma Aldrich | 2-Methylimidazole | 2-MI |

Description of the analytical methods used in the examples that follow:
Viscosity, Isothermal 120° C.
Instrument: Anton-Paar MCR 301
Parameters: cone-plate, 120° C. isothermal, gamma amplitude=2% frequency f=1 Hz, datapoint duration: 5 s.
Determination of gel time: when storage modulus=loss modulus (loss factor=1)
DSC
Instrument: Mettler DSC 1
Parameters: temperature −30° C. to +250° C., heating rate 10 K1 min
Determination of glass transition temperature (Tg):
half step-height method, midpoint DIN 51007
Determination of conversion:

$$100 - \left(\frac{\text{exothermal heat stream after curing} \times 100}{\text{exothermal heat stream before curing}}\right)$$

Example 1

In an appropriate stirred vessel, a batch composed of 37.5 g of Vestamin IPD, 15 g of Vestamin TMD, 22.5 g of triacetonediamine, 424 g of Epikote 828 and 4.99 g of 2-methylimidazole is made up and intimately mixed at 1200-1800 rpm in a Hauschild Speedmixer, model DAC 600.1 VAC-P. The viscosity profile of this epoxy resin composition was hereinafter determined isothermally at 120° C. with an Anton-Paar MCR 301 rheometer (cone/plate geometry)

In addition, a screening of curing was conducted. To this end, 5 g of the epoxy resin composition were weighed into an aluminium pan (diameter 50 mm) and the sample was cured in an air circulation drying cabinet at 120° C. for 4 min. Conversion and Tg were then determined by DSC (Mettler DSC 1 machine). The heating rate was 10 K/min from −30° C. to 250° C. All results are reported in table 2.

Example 2 (Non-Inventive)

In the same way as in Example 1, a mixture composed of 100 g of triacetonediamine and 360 g of Epikote 828 was made up in an appropriate stirred vessel and mixed intimately at 1200-1800 rpm in a Hauschild Speedmixer, model DAC 600.1 VAC-P. This epoxy resin composition was used in the same way as in Example 1 to conduct viscosity profile experiments and a screening of curing. While this formulation does have favourable rheological properties it also has an excessively long gel time and does not cure under the desired conditions. These results are also shown in table 2.

TABLE 2

|  | Example 1 | Example 2 (non-inventive): |
|---|---|---|
| Viscosity @ 120° C.: | | |
| time <100 mPas | 60 s | 215 s |
| time <500 mPas | 75 s | 400 s |
| gel time (min'sec''): | 2'25'' | 26'25'' |
| screening of curing: | | |
| conversion after 4 min at 120° C. | 99% | 33% |
| Tg of pure resin Glass transition temperature: | 129° C. | — (not cured) |
| laminate | 130° C. | not cured |

Example 3

6 layers of a biaxial carbon fabric (304 g/m², Saertex) were laid into a cavity with dimensions of 320×520×2 mm to achieve a fibre volume content for the finished component of about 55%. The cavity was closed tightly and heated to 120° C. 165 ml of the epoxy resin composition described in example 1 were injected into the mould over 1 minute at a pressure of 10 bar with a Tartler Nodopur VS2195 2-component apparatus and upon termination of mould filling the mixture was then cured for 4 minutes at 120° C. Once the curing time had elapsed the mould was opened and a carbon fibre-reinforced laminate having a Tg of 130° C. (DSC) was demoulded. All fibres were completely impregnated and the laminate showed no pores and/or cavities.

Example 4 (Non-Inventive)

6 layers of a biaxial carbon fabric (304 g/m², Saertex) were laid into a cavity with dimensions of 320×520×2 mm to achieve a fibre volume content for the finished component of about 55%. The cavity was closed tightly and heated to 120° C. 165 ml of the epoxy resin composition described in example 2 were injected into the mould over 1 minute at a pressure of 10 bar with a Tartler Nodopur VS2195 2-component apparatus and upon termination of mould filling the mixture was then cured for 4 minutes at 120° C. Once the curing time of 4 minutes had elapsed the mould was opened. It was not possible to demould the laminate since the resin matrix remained tacky and not fully cured.

European patent application EP15199600 filed Dec. 11, 2015, is incorporated herein by reference.

Numerous modifications and variations on the present invention are possible in light of the above teachings. It is therefore to be understood that within the scope of the appended claims, the invention may be practiced otherwise than as specifically described herein.

The invention claimed is:

1. A composition, comprising:
   an epoxy resin composition, and
   optionally a further additive, wherein
   said epoxy resin composition comprises:
   A) at least one epoxy compound;
   B) a hardener composition comprising:
      B1) 20%-40% by weight of at least one diamine and/or polyamine based on triacetonediamine, and
      B2) 60%-80% by weight of at least one further diamine and/or polyamine,
      wherein the stoichiometric ratio of the epoxy groups of A) and the number of active hydrogen atoms of the functional group(s) of B) varies from 1:0.5 to 1:1,
   and
   C) 0.1% to 10% by weight of at least one curing accelerator,
   D) optionally, at least one latent hardener,
   wherein the amounts of A)-D) add up to 100% by weight of said epoxy resin composition.

2. The composition according to claim 1, wherein epoxy compound A) is at least one member selected from the group consisting of
   a saturated epoxy compound, an unsaturated epoxy compound, an aliphatic epoxy compound, a cycloaliphatic epoxy compound, an aromatic epoxy compound, and a heterocyclic epoxy compound, and
   wherein the epoxy compound optionally has a hydroxyl group.

3. The composition according to claim 1, wherein
   epoxy compound A) is at least one member selected from the group consisting of a glycidyl ether, a glycidyl ester, an aliphatic epoxide, a diglycidyl ether based on at least one of bisphenol A and bisphenol F, and a glycidyl methacrylate.

4. The composition according to claim 1, wherein
   the epoxy compound A) is at least one member selected from the group consisting of
   an epoxy resin based on bisphenol A diglycidyl ether, an epoxy resin based on bisphenol F diglycidyl ether, 4,4'-methylenebis[N,N-bis(2,3-epoxypropyl)aniline], hexanediol diglycidyl ether, butanediol diglycidyl ether, trimethylolpropane triglycidyl ether, propane-1,2,3-triol triglycidyl ether, pentaerythritol tetraglycidyl ether, diglycidyl hexahydrophthalate, an aliphatic epoxy resin, and a cycloaliphatic epoxy resin.

5. The composition according to claim 1, wherein component B1) comprises at least one member selected from the group consisting of
   2,2,6,6-tetramethyl-4-aminopiperidine (TAD),
   hexamethylenebis(4-amino-2,2,6,6-tetramethylpiperidine),
   N-butyl-4-amino-2,2,6,6-tetramethylpiperidine, N,N-dimethylaminopropyl-4-amino-2,2,6,6-tetramethyl-piperidine,
N-propyl-4-amino-2,2,6,6-tetramethylpiperidine,
N-isopropyl-4-amino-2,2,6,6-tetramethylpiperidine,
N-hydroxyethyl-4-amino-2,2,6,6-tetramethylpiperidine,
N-methoxyethyl-4-amino-2,2,6,6-tetramethylpiperidine,
N-methoxyethyl-4-amino-2,2,6,6-tetramethylpiperidine,
N',N'-dimethylaminoethyl-4-amino-2,2,6,6-tetramethyl-piperidine,
N-morpholinoethyl-4-amino-2,2,6,6-tetramethylpiperidine,
N-piperazinoethyl-4-amino-2,2,6,6-tetramethylpiperidine, and
4-morpholino-2,2,6,6-tetramethylpiperidine.

6. The composition according to claim 1, wherein component B2) comprises at least one member selected from the group consisting of a primary diamine, a secondary diamine, a primary polyamine, and a secondary polyamine.

7. The composition according to claim 1, wherein component B2) comprises at least one of:
a) an aliphatic amine;
b) at least one oxyalkylenepolyamine selected from the group consisting of polyoxypropylenediamine and polyoxypropylenetriamine, 1,13-diamino-4,7,10-trioxatridecane, and 4,7-dioxadecane-1,10-diamine;
c) at least one cycloaliphatic amine selected from the group consisting of isophoronediamine (3,5,5-trimethyl-3-aminomethylcyclohexylamine), 4,4'-diaminodicyclohexylmethane, 2,4'-diaminodicyclohexylmethane and 2,2'-diaminodicyclohexylmethane, alone or in mixtures of the isomers, 3,3'-dimethyl-4,4'-diaminodicyclohexylmethane, N-cyclohexyl-1,3-propanediamine, 1,2-diaminocyclohexane, 3-(cyclohexylamino)propylamine, piperazine, N-aminoethylpiperazine, TCD diamine (3(4),8(9)-bis(aminomethyl)tricyclo[5.2.1.02,6]decane), and 4-methylcyclohexane-1,3-diamine;
d) an araliphatic amine;
e) at least one aromatic amine selected from the group consisting of phenylenediamines, phenylene-1,3-diamine, phenylene-1,4-diamine, 4,4'-diaminodiphenylmethane, 2,4'-diaminodiphenylmethane, and 2,2'-diaminodiphenylmethane, alone or in mixtures of the isomers;
f) an adduct hardener which is the reaction product of an epoxy compound with excess amine;
g) a polyamidoamine hardener which is obtained by condensation of a mono- and/or polycarboxylic acid with a polyamine;
h) a Mannich base hardener which is obtained by reaction of a mono- and/or polyhydric phenol with an aldehyde and a polyamine; and
i) a Mannich base.

8. The composition according to claim 7, wherein said Mannich base is based on phenol and/or resorcinol, formaldehyde and m-xylylenediamine, N-aminoethylpiperazine and blends of N-aminoethylpiperazine with nonylphenol and/or benzyl alcohol, phenalkamines which are obtained in a Mannich reaction from cardanols, aldehydes and amines.

9. The composition according to claim 1, wherein component B2) comprises at least one member selected from the group consisting of
isophoronediamine;
4,4'-diaminodicyclohexylmethane;
2,4'-diaminodicyclohexylmethane;
2,2'-diaminodicyclohexylmethane;
a mixture of at least two of 4,4'-diaminodicyclohexylmethane, 2,4'-diaminodicyclohexylmethane, and 2,2'-diaminodicyclohexylmethane;
polyoxypropylenediamine;
polyoxypropylenetriamine;
a mixture of poly oxypropylenediamine and polyoxypropylenetriamine;
at least one adduct based on a reaction product of an epoxy compound and at least one member selected from the group consisting of isophoronediamine; 4,4'-diaminodicyclohexylmethane; 2,4'-diaminodicyclohexylmethane; 2,2'-diaminodicyclohexylmethane; a mixture of at least two of 4,4'-diaminodicyclohexylmethane, 2,4'-diaminodicyclohexylmethane, and 2,2'-diaminodicyclohexylmethane; polyoxypropylenediamine; polyoxypropylenetriamine; and a mixture of polyoxypropylenediamine and polyoxypropylenetriamine.

10. The composition according to claim 1, wherein component B2) comprises at least one member selected from the group consisting of
a) isophoronediamine,
b) 4,4'-diaminodicyclohexylmethane, 2,4'-diaminodicyclohexylmethane, 2,2'-diaminodicyclohexylmethane, a combination of at least two of 4,4'-diaminodicyclohexylmethane, 2,4'-diaminodicyclohexylmethane, 2,2'-diaminodicyclohexylmethane, a combination of isophoronediamine and a mixture of 2,2,4-trimethylhexamethylenediamine and 2,4,4-trimethylhexamethylenediamine, or a combination of isophoronediamine with a mixture of 2,2,4-trimethylhexamethylenediamine and 2,4,4-trimethylhexamethylenediamine and at least one of 4,4'-diaminodicyclohexylmethane, 2,4'-diaminodicyclohexylmethane, and 2,2'-diaminodicyclohexylmethane, and
c) an adduct hardener based on a reaction product of an epoxy compound and a) or b).

11. The composition according to claim 1, wherein component B2) comprises at least one member selected from the group consisting of
isophoronediamine;
at least one of 4,4'-diaminodicyclohexylmethane, 2,4'-diaminodicyclohexylmethane, 2,2'-diaminodicyclohexylmethane;
a mixture of 2,2,4-trimethylhexamethylenediamine and 2,4,4-trimethylhexamethylenediamine; and
an adduct based on a reaction product of epoxy compound and at least one member selected from the group consisting of isophoronediamine; at least one of 4,4'-diaminodicyclohexylmethane, 2,4'-diaminodicyclohexylmethane, 2,2'-diaminodicyclohexylmethane; and a mixture of 2,2,4-trimethylhexamethylenediamine and 2,4,4-trimethylhexamethylenediamine.

12. The composition according to claim 1, wherein component B) is a mixture of:
B1) 25%-35% by weight of triacetonediamine; and
B2) 65%-75% by weight of a mixture of 3-aminomethyl-3,5,5-trimethylcyclohexylamine, 2,2,4-trimethylhexamethylenediamine, and 2,4,4-trimethylhexamethylenediamine.

13. The composition according to claim 1, wherein component C) comprises at least one member selected from the group consisting of imidazole and an imidazole compound.

14. The composition according to claim 1, wherein component D) is present and is at least one member selected from the group consisting of dicyandiamide, cyanoguanidine, an aromatic amine, a guanidine, a modified polyamine, a N-acylimidazole, an imidazole, a carbonyl hydrazide, a triazine compound, melamine, a melamine compound, a N-cyanoacylamide compound, and a acylthiopropylphenol.

15. A composite, obtained from the composition according to claim 1.

16. A composite,
obtained from
1) at least one fibrous carrier;
and
2) a composition according to claim 1.

17. A method for producing a composite according to claim 16, said method comprising:
   I providing said epoxy resin composition which is a reactive composition;
   II impregnating the fibrous carrier with the composition from I in a closed mould;
   III curing the reactive composition to afford the composite component in the closed mould; and
   IV demoulding the finished component from a cavity of the mould.

18. An article, comprising the composite according to claim 16.

19. The article according to claim 18, which is an article in boat- and shipbuilding, in aerospace technology, in automobile construction, for two-wheeled vehicles, in the automotive, construction, medical technology and sports sectors, the electrical and electronics industry, and in energy generation installations.

20. The article according to claim 18, which is a rotor blade of a wind turbine.

* * * * *